Nov. 6, 1956 R. P. DUNMIRE 2,769,443
HYPODERMIC DEVICES
Filed Sept. 29, 1954 2 Sheets-Sheet 1
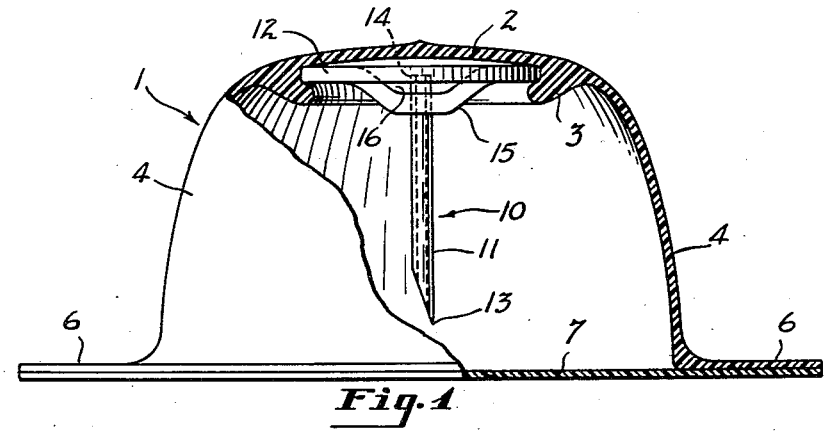
Fig. 1
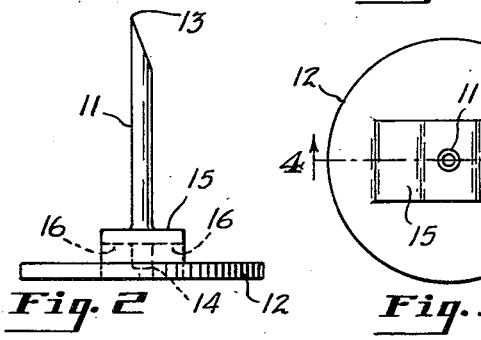
Fig. 2 Fig. 3
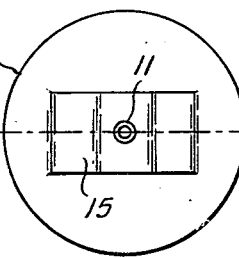
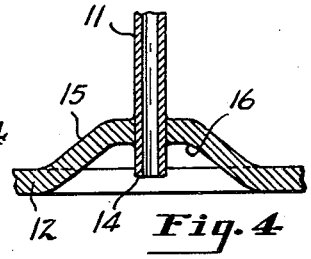
Fig. 4
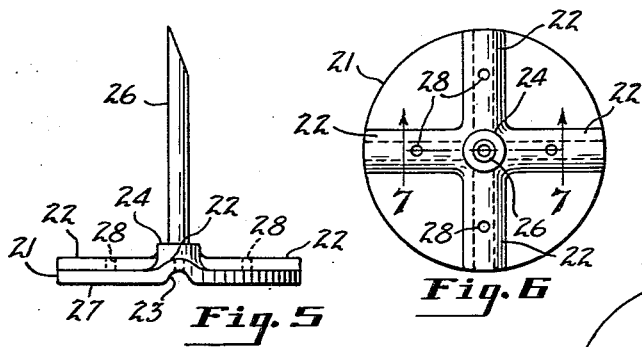
Fig. 5 Fig. 6
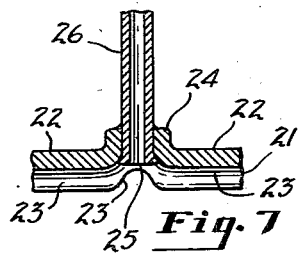
Fig. 7
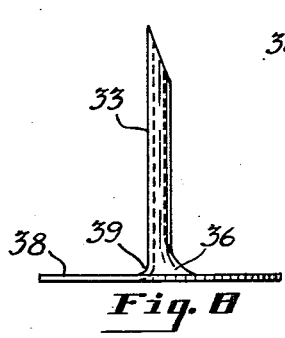
Fig. 8
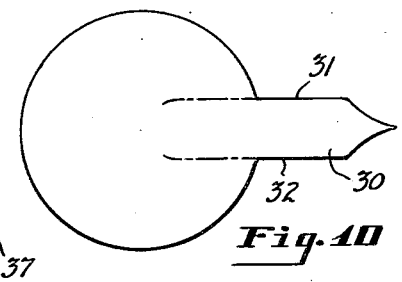
Fig. 9 Fig. 10
INVENTOR
Russell P. Dunmire
BY Evans + McCoy
ATTORNEYS Nov. 6, 1956 R. P. DUNMIRE 2,769,443
HYPODERMIC DEVICES Filed Sept. 29, 1954 2 Sheets-Sheet 2

INVENTOR
Russell P. Dunmire
BY Evans + McCoy
ATTORNEYS

United States Patent Office 2,769,443
Patented Nov. 6, 1956

2,769,443

HYPODERMIC DEVICES

Russell P. Dunmire, Chagrin Falls, Ohio

Application September 29, 1954, Serial No. 459,188

12 Claims. (Cl. 128—216)

This invention relates to devices for injecting fluids through membranes and particularly to devices for effecting subcutaneous injections of medicaments and the like into human beings and animals. Still more particularly, this invention relates to hypodermic devices of the general character illustrated in Figs. 1 to 6 of my allowed copending application, Serial No. 248,806, filed September 28, 1951, for "Hypodermic Syringe" (U. S. Patent 2,696,212, granted December 7, 1954), of which this application is a continuation in part.

As noted in my said copending application, it is contemplated that the hypodermic devices described and claimed therein will generally be discarded after being used to perform one injection. In order for single-use, disposable, injection devices to be widely used by doctors and by their patients in preference to the less convenient, conventional, reusable syringes of the past, it is obvious that the cost of manufacture of the disposable devices must be kept extremely low, of the order of a very few cents each. This, in turn, requires that the disposable devices be manufactured on a mass production basis with a minimum of hand labor and mechanical operations, and with the cost of materials and component manufactured parts reduced to a minimum.

Since sterilization of all parts of such devices to which the needle or medicaments are exposed is also essential, low production costs also requires the use of syringe designs and manufacturing and filling techniques which may be combined with rapid, low cost, sterilization processes.

The present invention is directed broadly to improvements in the syringes of Figs. 1 to 6 of my said copending application, the principal object of the improvements being to simplify the manufacturing, filling, and sterilization operations while reducing the cost of materials and component parts to the greatest extent that is consistent with the requirements of reliable operation, adequate shelf-life, and resistance to damage during packaging, shipment, and subsequent individual handling up to the time of actual use.

A more specific object of the invention is to provide an improved, collapsible shell for holding both a medicament and a hypodermic needle, which shell can be molded or similarly formed by low cost, mass production techniques and which is provided with improved, integrally formed securing means for subsequently receiving the butt end of a special needle and holding it with the required rigidity.

Another specific object of the invention is to provide special hypodermic needles for use in the improved collapsible shells, the needles being inexpensive to manufacture, adapted to be easily and quickly sterilized over their entire inner and outer surfaces by electronic means, and being provided with heads adapted to be received and gripped by the integrally formed needle securing means of the improved collapsible shell.

Still another object of the invention is to provide an improved composite design of collapsible shell and hypodermic needle which may be easily and quickly assembled in cooperation relationship by automatic machinery at any time prior to final closing of the shell.

In general, the invention is characterized by a shell having a relatively thick, rigid, end wall and relatively thin, flexible, side walls defining a fluid reservoir, and an integrally formed annular flange on the inner surface of the end wall of the shell; a hypodermic needle having a head portion and a needle or shank portion with a hollow bore, the head portion being adapted to be secured to the end wall of the shell by the annular flange thereon for movement therewith; and a passageway from the reservoir within the shell into the bore of the shank portion of the needle adjacent the butt end thereof. In addition, the various forms that such needles may take are all characterized by a butt end or head portion of relatively large outer diameter and small axial thickness and a passageway extending continuously from end to end of the needle through the shank portion and butt portion thereof along a straight path permitting an electron stream to pass axially therethrough for sterilization purposes, and by an aperture or passageway from the exposed side of the head portion (away from the adjacent end wall of the shell) into the needle adjacent the butt end thereof through which medicament contained by the shell may flow directly into the needle as the shell is collapsed.

The foregoing and additional objects, advantages, and features of the invention will be more fully understood from the following detailed description of illustrative forms of the invention and from the accompanying drawings in which—

Figure 1 is an elevation on an enlarged scale, partly broken away for clarity, of a hypodermic syringe embodying the present invention;

Fig. 2 is an elevation of the hypodermic needle forming a part of the device of Fig. 1;

Fig. 3 is a plan view of the hypodermic needle of Fig. 2;

Fig. 4 is a fragmentary vertical section, on a further enlarged scale, of the hypodermic needle of Figs. 2 and 3, the plane of the section being indicated by the line 4—4 in Figs. 3;

Fig. 5 is an elevation of a modified form of hypodermic needle for use in the device of Fig. 1;

Fig. 6 is a plan view of the hypodermic needle of Fig. 5;

Fig. 7 is a fragmentary vertical section, on a further enlarged scale, of the hypodermic needle of Figs. 5 and 6, the plane of the section being indicated by the line 7—7 in Fig. 6;

Fig. 8 is an elevation of another modified form of hypodermic needle for use in the device of Fig. 1;

Fig. 9 is a plan view of the hypodermic needle of Fig. 8;

Fig. 10 is a plan view of a blank from which the hypodermic needle of Figs. 8 and 9 may be formed;

Figure 11:
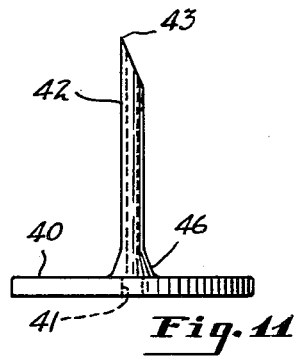
Fig. 11 is an elevation of another modified form of hypodermic needle for use in the device of Fig. 1.

Referring to Fig. 1, the hypodermic device shown therein comprises a shell 1 having a generally circular, upper end wall 2 that is rigidified by a relatively thick, annular, interior rib 3 integrally formed thereon and having flexible side walls 4 that slope outwardly as shown and extend circumferentially about the end wall 2 to give the shell the general form of an inverted cup. The side wall of the shell has an outwardly directed flange 6 integrally formed thereon and extending around the lower periphery thereof. A generally flat lower end wall 7 closes the shell and is secured to the circumferential flange 6, as by a suitable cement or by bonding under heat and pressure.

The shell 1 and lower end wall 7 thereof are preferably made of a tough, but relatively flexible, molded plastic, such as polyethylene. The wall thicknesses of the side walls 4 and end wall 2 are chosen so that, upon axial compression of the shell by pressure of the thumb on the end wall 2 while the lower end wall 7 rests on the portion of the anatomy of the person to receive an injection, the side walls 4 will collapse while the end wall 2 remains substantially undistorted. The thickness of the lower end wall 7 is chosen so that it will withstand moderate internal pressure without bursting and yet be easily punctured by a needle (hereinafter described) carried within the shell by the end wall 2.

A hypodermic needle 10 having a tubular shank portion 11 of small diameter and a circular base portion 12 of relatively large diameter and small axial thickness, is disposed entirely within the shell 1. The base portion 12 is seated snugly against the inner surface of the upper end wall 2 with its peripheral margin held under the inturned lip of the annular rib 3 thereon. As shown, the rib 3 surrounds the longitudinal axis of the upper end wall 2 and is directed a short distance inwardly toward said axis in closely spaced overlying relation to the adjacent, surrounded portion of said end wall and to the peripheral margin of the base portion 12 of said needle. The end or lip of the rib 3 is rounded, and this, in conjunction with the moderate flexibility of the rib, permits the base portion 12 of the needle to be snapped into place during initial assembly of the device and before applying the lower end wall 7 to the shell 1. If desired, the construction of the base portion of the needle may be such that the margin thereof is inwardly or radially compressible, or the entire base portion thereof may be constructed of a moderately flexible material (as hereinafter described) to facilitate snapping it into position.

As shown, the shank 11 of the needle 10 has a sharply pointed end 13 directed toward and disposed closely adjacent the lower end wall 7, and the opposite or butt end 14 of the needle is secured to the center of the base portion 12 thereof. In the form of needle shown in Fig. 1 and illustrated in more detail in Figs. 2, 3, and 4, the base portion 12 thereof has a bridge portion 15, struck out from the body thereof to provide a pair of openings 16 on opposite sides thereof, permitting a liquid medicament (not shown) in the shell 1 to flow freely around opposite sides of the bridge portion 15 to the butt end 14 of the needle shank. The butt end 14 of the needle shank may project through the bridge portion 12 and be secured thereto as by welding or swaging, but it is spaced from the upper end wall 2 of the shell to permit the fluid medicament to flow freely into the butt end of the needle and through the shank 11 as the shell is collapsed.

In accordance with the preferred method of assembling the hypodermic device of Fig. 1, the needle is first seated in place in the shell 1, and then the shell is filled with the desired medicament while the shell is inverted from the position shown in Fig. 1. The end wall 7 is then applied and cemented or otherwise bonded to the flange 6 of the shell to provide a moisture and vapor proof closure seal. Any required sterilization operations may be performed prior to, during, and/or after this assembly is completed.

In use, the device is merely positioned with the lower end wall 7 centered over and resting against the area of a body to be injected, and the upper end wall 2 is forced firmly toward the lower end wall 7, as by thumb pressure. The side walls 4 are readily deformed and collapsed in this manner, forcing the point of the needle 10 through the lower end wall 7 and into the body to be injected. Until the needle has penetrated the lower end wall 7, no medicament can escape. Being sharply pointed, the needle punctures the lower end wall 7 to produce, initially, a very small aperture therein, into which the main part of the shank 11 of the needle is forced. This expands the initial aperture with a substantially uniform pressure against its entire periphery and automatically creates an effective seal preventing escape of any appreciable amount of medicament between the needle and the periphery of the opening formed in the lower end wall 7. Also, the needle begins to penetrate the body to be injected immediately upon emerging through the lower end wall 7. Thus, substantially all of the medicament forced out of the shell by the collapsing of the side walls 4 passes through the needle and into the body being injected; and the non-collapsible space in the shell, when designed as shown and described, is so small that practically all of its original contents are discharged through the bore of the needle.

In producing devices of the character hereinabove described, a major part of the cost is the cost of the needle. Therefore, in order to obtain the maximum utilization of such devices, it is essential to employ a needle design which can be produced at a minimum cost while being capable of efficient and reliable operation.

It is also essential that the needle be easily sterilized both inside and out, and, preferably, after the device has been fully assembled, as by means of an electron beam. An electron beam is capable of penetrating such materials as polyethylene, which are most useful for making the shell 1, but is not capable of penetrating stainless steels, of which the needles would generally be fabricated. This makes it desirable, in the case of stainless steel needles, for example, to avoid any obstruction of the line of the bore of the needle at either end by material which is not readily penerated by an electron beam.

Having in mind the foregoing desirable objectives, as well as the efficiency and reliability of the needles in operation and the ease of assembling them with the shell in the manner described above, I have devised the various additional needle forms shown in Figs. 5 to 21 inclusive of the drawing.

Referring to the needle illustrated in Figs. 5, 6, and 7, the base portion 21 thereof is in the form of a circular plate or disk deformed to provide a plurality of ribs 22 on one surface thereof and a plurality of oppositely disposed, generally complementary, channel depressions 23 in the opposite surface thereof. The ribs and channel depressions radiate outwardly from a centrally located boss 24 having an axially extending opening therethrough, and the butt end 25 of the shank 26 of the needle is secured in the aperture through the boss 24, as by swaging or welding. As best shown in Fig. 7, the butt end 25 of the needle is open into the bore of the needle and is spaced from the bottom surface 27 of the disk 21 providing free communication between the channels 23 and the bore of the needle on one side of the disk. At least one aperture 28 is formed through the top of each of the ribs 22 (Figs. 5 and 6) to provide free communication therethrough from the ribbed side of the disk into the channels 23.

In this form of needle, the ribs 22 add rigidity to the base portion 21, and the apertures 28 in the ribs permit free flow of liquid from the ribbed side of the base portion 21 into the channels 23 in the opposite side thereof, and thence into the bore of the needle shank 26 at the butt end 25 thereof. When snapped into place in the shell 1 (Fig. 1) in the same manner as the needle of Figs. 2, 3, and 4, it will obviously function in essentially the same manner. The form of needle shown in Figs. 5, 6, and 7, however, provides a more rigid base for supporting the needle and possess the assembly advantage of providing a greater surface in gripping engagement with the shank 26 of the needle.

Referring to the needle illustrated in Figs. 8, 9, and 10, the entire structure may be fabricated from a flat sheet as one integral piece from a blank having the configuration shown in Fig. 10. The blank is cut along the dot-dash lines, and the elongated portion 30 thereof is bent in the region where it remains attached to the remainder of the blank until the elongated portion extends at right angles to the plane of the remainder of the blank. At the same time, the portion 30 is deformed into a tubular body with its original longitudinal edges 31 and 32 abutting to form the shank 33 of the needle with a longitudinal seam 34 therein. To accomplish this result, the metal in the region of the right angle bend joining the shank 33 to the remainder of the blank is drawn as it is deformed to provide warped web portions 35 and 36 that flare upwardly and merge into the seam 34 and flare downwardly and merge with the parallel edges of a radial slot 37 left in the remainder of the blank. These webs provide a relatively rigid juncture of the formed shank 33 with the remainder of the blank, which constitutes the base portion 38 of the needle.

The longitudinal seam 34 in the shank of the needle may be made sufficiently tight, without welding or other type of sealing, to be substantially liquid-tight at the relatively low pressures existing for the brief period before the needle has penetrated the body to be injected for the full length of the portion of the shank 33 projected out of the shell 1 through the lower end wall 7 (Fig. 1). The restricting effect of the aperture punctured through the lower end wall 7 of the shell, and the similar effect of the epidermis next penetrated by the needle, assist in preventing any spreading of the edges of the seam 34 because of fluid pressure inside the needle during the injection operation.

The above described forming operation produces a hypodermic needle having a generally circular plate forming the base portion 38. This plate has a slot 37 therein that extends diametrically inwardly from the periphery of the plate to slightly beyond the center thereof, terminating at its inward end in the region 39, where the shank 33 of the needle is integrally joined to and merges with the base portion 38 thereof around at least half the periphery of the shank 33. The shank 33 of the needle is concentric with the central axis of the base portion and is aligned with the inward end portion of the slot 37 so that no metal is in alignment with the bore of the needle beyond its butt end. The longitudinal seam 34 of the shank 33 is spread open adjacent the base portion 38 so as to produce stiffening webs 35 and 36 formed integrally with both the shank 33 and base portion 38. The result is a needle capable of being formed in a relatively simple manner from a single flat sheet and possessing all of the essential characteristics of the needles previously described, except that a fluid medicament contained in the shell 1 (Fig. 1) carrying this needle may flow directly into the bore of the needle at the butt end thereof between the webs 35 and 36, without first flowing through the base portion 38. The base portion 38 of this form of needle, being relatively thin, may be resiliently distorted by cupping it slightly to assist in snapping it past the lip of the rib 3 in the shell 1 to position it therein.

Figure 12:
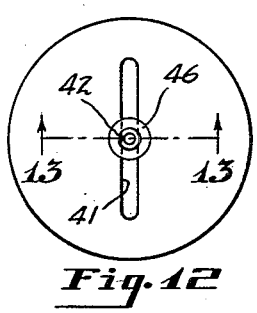
Fig. 12 is a plan view of the hypodermic needle of Fig. 11.
Figure 13:
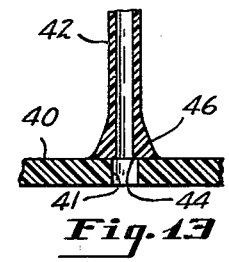
Fig. 13 is a fragmentary vertical section, on a further enlarged scale, of the hypodermic needle of Figs. 11 and 12, the plane of the section being indicated by the line 13—13 in Fig. 12.

The form of needle shown in Figs. 11, 12, and 13 is particularly adapted to be made of a suitable plastic, such as the class of long chain, polymeric amides and the like, known in the trade as "nylon," though it may also be made of a suitable metal. This needle comprises a circular plate or disk 40 forming the base portion of the needle and having a diametrically disposed slot 41 therein that stops short of the periphery of the disk 40. The shank 42 of the needle, having a bore extending completely therethrough from its pointed tip end 43 to its butt end 44, has its butt end secured to the center of the base portion 40 with the bore of the shank aligned and communicating with the slot 41. The base portion 40 and shank 42 may be separately molded or otherwise formed and then joined as described, or the base portion and shank may be molded together as an integral piece. In either case, the butt end of the shank is preferably thickened as indicated at 46 in the drawings to rigidify its juncture with the base portion and to provide a greater contact area for bonding the shank and base portion together when they are separately molded. Depending on the thickness and rigidity of the base portion 40, it may be resiliently deformed by cupping it when snapping it past the lip of the rib 3 in the shell 1, as in the case of the needle of Figs. 8 and 9.

The resulting structure may be generally described as a needle having a base portion 40 in the form of a generally circular plate, with an elongated diametrically extending aperture 41 therein into which fluid may flow from one side of the plate, and a tubular needle shank 42 secured to and extending axially from the same side of the plate, with the bore of the shank communicating with the elongated aperture 41, and with the butt end 44 of the shank thickened and joined to the base portion 40 on opposite sides of the elongated aperture 41.

When such a needle is snapped into place in the shell 1 (Fig. 1) it will be supported therein and function in cooperation with the shell in the same general manner as the others herein described. It is extremely simple to produce by modern techniques of molding and fabricating plastic articles, and can be produced at a very low cost.

Figure 14:
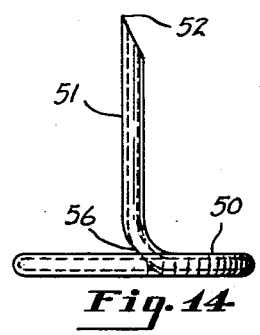
Fig. 14 is an elevation of another modified form of hypodermic needle for use in the device of Fig. 1.
Figure 15:
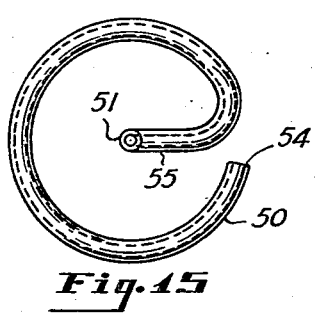
Fig. 15 is a plan view of the hypodermic needle of Fig. 14.

Depending upon the stiffness of the annular rib 3 of the shell 1 (Fig. 1), it may be found desirable to employ a needle having a circular base portion capable of resilient radial contraction to facilitate snapping it into place under the lip of the rib 3. Such a needle is illustrated in Figs. 14 and 15 in which both the circular base portion 50 and shank 51 are formed as an integral unit from a single piece of stainless steel tubing of uniform diameter and wall thickness. This is readily done merely by bending one end of a length of the tubing to form substantially a complete annulus constituting the base portion 50, the remainder of the length of the tubing being bent gradually inwardly substantially along a radius of the annulus to the center thereof and then axially of the annulus to form the shank 51, which may be sharpened to provide the required pointed end 52. As will be apparent, the annular base portion 50 may be radially contracted for the above stated purpose and may be provided with sufficient resilience to spread outwardly again and seat itself firmly against the upper end wall 2 of the shell 1. The free end 54 of the base portion 50 being open, the fluid contents of the shell 1 may freely flow into the needle through this end and be discharged from the pointed end 52 thereof as the shell 1 is collapsed. In addition to the advantage of the radially contractible base 50, this form of needle has the further advantage of being easily fabricated from standard tubing with great rapidity. If required for easier inspection and sterilization, the bend where the needle shank 51 merges into the radially extending base section 55 may have one side thereof ground off, pierced, or otherwise removed at 56 to eliminate any obstruction to the passage of light or an electron beam into either end of the shank 51 and out the other end thereof.

Figure 16:
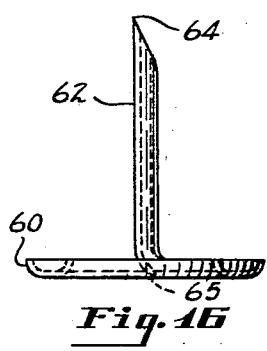
Fig. 16 is an elevation of another modified form of hypodermic needle for use in the device of Fig. 1.
Figure 17:
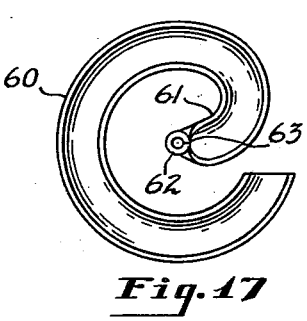
Fig. 17 is a plan view of the hypodermic needle of Fig. 16.

A variation of the form of needle shown in Figs. 14 and 15, which is preferred from the standpoint of inspection and sterilization, is shown in Figs. 16 and 17. This form of needle has the same general shape as the form shown in Figs. 14 and 15, but is fabricated from a length of channel instead of tubing. The length of channel is bent at one end to form a similar annular base portion 60 and inwardly extending section 61. The remainder of the length of channel is then bent to extend axially from the center of the annulus in the direction toward which the channel of the annulus opens, to form the shank portion 62 of the needle. This last portion of the length of channel has its edges rolled gradually inwardly into abutment adjacent the section 61 to give the shank 62 a tubular form having a longitudinal seam 63, similar to the seam 34 in the form of needle shown in Figs. 8 and 9. The tip of the shank 62, of course, is sharpened to a point 64, and an aperture 65 may be pierced or otherwise formed through the base of the channel in alignment with the bore of the shank for the inspection and sterilization purposes previously mentioned.

Figure 18:
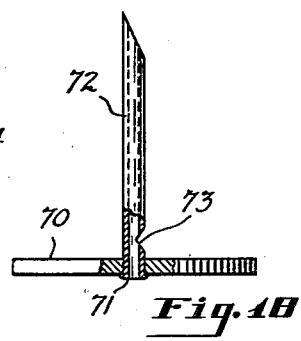
Fig. 18 is an elevation, partly broken away, of another modified form of hypodermic needle for use in the device of Fig. 1.

Another extremely simple form of needle is illustrated in Fig. 18 and comprises a flat, circular plate or disk forming the base portion 70 and having a central aperture therethrough. The butt end 71 of the needle shank 72 projects through this opening and is swaged in place. To provide access of fluid into the butt end of this needle, a notch 73 may be cut or ground in one side thereof closely adjacent the base portion 70.

As will be apparent, the needle of Fig. 18 may be snapped into place in the shell 1 and securely held therein in the same manner as those heretofore described, and, as in some of the previously described forms, fluid may flow into the needle adjacent the butt end thereof without being required first to flow through openings provided in the base portion thereof.

Figure 19:
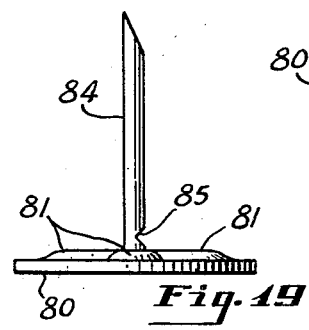
Fig. 19 is an elevation of another modified form of hypodermic needle for use in the device of Fig. 1.
Figure 20:
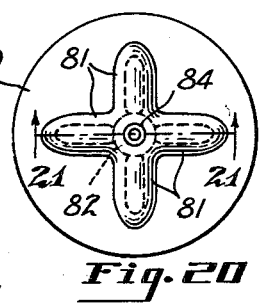
Fig. 20 is a plan view of the hypodermic needle of Fig. 19.
Figure 21:
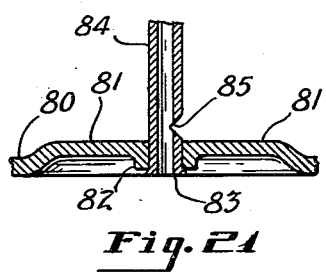
Fig. 21 is a fragmentary vertical section, on a further enlarged scale, of the hypodermic needle of Figs. 19 and 20, the plane of the section being indicated by the line 21—21 of Fig. 20.

A variation of the form of needle shown in Fig. 18 is shown in Figs. 19, 20, and 21 in which the circular base portion 80 is rigidified by having a plurality of radiating ribs 81 formed therein. The ribs 81 terminate at their outer extremities short of the periphery of the base portion 80 to leave a peripheral margin of uniform thickness thereon to be gripped under the lip of the annular flange 3 in the shell 1 (Fig. 1). At the center of the base portion 80, the ribs 81 merge into a downwardly turned annular flange 82 that surrounds a central aperture receiving the butt end 83 of the tubular needle shank 84. The flange 82 provides a sleeve of appreciable length along the butt end of the needle for better supporting the same. As in Fig. 18, the butt end 83 of this needle of Figs. 19, 20, and 21 is swaged in the central aperture of the base portion 80. Access of fluid to the interior of the shank 84 of the needle adjacent the butt end thereof is again provided for by a notch 85 in one side thereof. This construction retains the structural and fabrication simplicity of the needle of Fig. 18 while providing greater strength and rigidity both in the base portion 80 itself and in the attachment of the shank 84 thereto.

The several forms of needles shown in Figs. 2 to 21 and described above illustrate the kinds of variations in structure which may be resorted to as design, fabrication, assembly, testing, sterilization, and cost considerations may dictate. Each has certain advantages, as has been pointed out in the foregoing description. In all of them, it will be observed, the line of the bore of the needle is not obstructed by any metal at either end to facilitate both inspection and sterilization. All are adapted to be assembled with the shell 1 (Fig. 1) and to cooperate therewith during collapsing of the shell in essentially the same manner.

Having described my invention, I claim:

1. A hypodermic device comprising a shell having a relatively thick, rigid, end wall and relatively thin, flexible, side walls defining a fluid reservoir, and an integrally formed annular flange on the inner surface of the end wall; a hypodermic needle having a head portion and a shank portion with a hollow bore, the head portion being secured to said end wall by said annular flange for movement therewith, and a passageway from said reservoir into the bore of the shank portion of said needle adjacent the butt end thereof.

2. In a hypodermic device including a shell defining a closed fluid reservoir having a relatively rigid end wall and flexible side walls permitting longitudinal collapsing of the shell, and a hypodermic needle extending longitudinally of the shell and enclosed therein with its butt end adjacent said end wall; said needle having a tubular shank of small diameter and a generally circular base portion of relatively large diameter and small axial thickness, the base portion of the needle being disposed against the inner surface of said end wall, and an annular flange integrally formed on the inner surface of said end wall, said flange snugly surrounding and overlying the peripheral margin of the base portion of said needle for retaining it firmly in position.

3. In a hypodermic device including a shell defining a closed fluid reservoir having a relatively rigid end wall and flexible side walls permitting longitudinal collapsing of the shell, and a hypodermic needle extending longitudinally of the shell and enclosed therein with its butt end adjacent said end wall; an annular flange integrally formed on the inner surface of said end wall and surrounding the longitudinal axis thereof, said flange being directed a short distance toward said axis in closely spaced overlying relation to the adjacent portion of said end wall within said flange to define a shallow, undercut, annular groove, said needle having a tubular shank of small diameter and a generally circular base portion of relatively large diameter and small axial thickness, the diameter of said base portion being substantially equal to the maximum diameter of said annular groove, said base portion being resiliently distortable to facilitate seating it in place within said annular flange, whereby said base portion is retained by said flange against said end wall with the edge of the base portion seated snugly in said annular groove.

4. A hypodermic needle in the device of claim 2 in which the base portion of said needle is an integral extension of the shank and extends outwardly from and around the shank in the form of a loop capable of resilient radial contraction.

5. A hypodermic needle in the device of claim 2 in which the base portion of said needle is an integral extension of the shank that is split along one side and spread to merge into a channel shape in cross section, said channel-shaped extension being bent sharply in one direction adjacent the butt end of said shank to extend radially outwardly and then arcuately to extend around said shank in a transverse plane to form a circular loop capable of resilient radial contraction.

6. A hypodermic needle in the device of claim 2 in which the base portion of said needle is an integral extension of the shank that is split along one side and spread to merge into a channel shape in cross section, said channel-shaped extension being bent sharply in one direction adjacent the butt end of said shank to extend radially outwardly and then arcuately to extend around said shank in a transverse plane to form a circular loop capable of resilient radial contraction, the channel of said extension communicating with the bore of said shank and having its open side beyond said sharp bend facing away from said end wall of said shell.

7. A hypodermic needle in the device of claim 2 in which the base portion of said needle is an integral extension of the shank that is split along one side and spread to merge into a channel shape in cross section, said channel-shaped extension being bent sharply in one direction adjacent the butt end of said shank to extend radially outwardly and then arcuately to extend around said shank in a transverse plane to form a circular loop capable of resilient radial contraction, the channel of said extension communicating with the bore of said shank and having its open side beyond said sharp bend facing away from said end wall of said shell, and the sides of said channel-shaped extension being of increased depth at said sharp bend for increased rigidity at that point.

8. In a hypodermic device including a shell defining a closed fluid reservoir having a relatively rigid end wall and flexible side walls permitting longitudinal collapsing of the shell, and a hypodermic needle extending longitudinally of the shell and enclosed therein with its butt end adjacent said end wall; a resiliently deformable annular flange integrally formed on the inner surface of said end wall and surrounding the longitudinal axis thereof, said flange being directed a short distance toward said axis in closely spaced overlying relation to the adjacent portion of said end wall within said flange to define a shallow, undercut, annular groove, said needle having a tubular shank of small diameter and a circular base portion of relatively large diameter and small axial thickness, the diameter of said base portion being substantially equal to the maximum diameter of said annular groove, whereby the base portion of said needle may be seated within said annular flange and firmly retained thereby against said end wall with the edge of the base portion of the needle seated snugly in said annular groove.

9. A hypodermic needle in the device of claim 8 in which the base portion of said needle is a generally circular plate having an opening therethrough at the center thereof, the shank of the needle having a bore aligned with said opening and having its butt end rigidly secured to the plate, and an opening through the side wall of said shank and into the interior bore thereof adjacent said plate.

10. A hypodermic needle in the device of claim 8, in which the base portion of said needle is a generally circular plate having an elongated diametrically extending aperture therein, and the shank of the needle extends axially from one side of said plate with the bore of the shank communicating with said aperture and the butt end of the shank joined to said plate on opposite sides of said aperture.

11. A hypodermic needle in the device of claim 8, in which the base portion of said needle is a generally circular plate having a slot therein that extends diametrically inwardly from the periphery of the plate to slightly beyond the center thereof, the butt end of the shank of the needle around at least half of its periphery being formed integrally with the base portion about the inward end portion of said slot and disposed in alignment therewith, and the shank of the needle having a longitudinal seam that is centrally disposed with respect to the other half of the needle's periphery, said seam being spread open adjacent the base portion of the needle so as to produce stiffening webs formed integrally with said shank and base portion at opposite sides of said slot.

12. A hypodermic needle in the device of claim 8, in which the base portion of said needle is a generally circular plate having a central boss and an axially directed aperture through said boss, the butt end of said needle being mounted in the aperture through said boss, the base portion of said needle being deformed to provide a plurality of ribs on one surface thereof and a plurality of oppositely disposed channel depressions in the opposite surface thereof, said ribs and channel depressions radiating outwardly from said boss toward the outer periphery of said base portion with the bore of said needle communicating with said channel depressions, and at least one aperture extending through each of said ribs whereby fluid may flow through the rib apertures into said channels and through said channels into the bore of said needles.

References Cited in the file of this patent

UNITED STATES PATENTS 2,403,074     Goldsmith _____ July 2, 1946